US009223884B2

(12) United States Patent
Wittig et al.

(10) Patent No.: US 9,223,884 B2
(45) Date of Patent: Dec. 29, 2015

(54) RESOURCE IDENTIFIER PERSONALIZATION

(75) Inventors: Frank Wittig, Spiesen Elversberg (DE); Dirk Wagner, Schiffweiler (DE)

(73) Assignee: SAP SE, Walldorf (DE)

( * ) Notice: Subject to any disclaimer, the term of this patent is extended or adjusted under 35 U.S.C. 154(b) by 821 days.

(21) Appl. No.: 11/947,504

(22) Filed: Nov. 29, 2007

(65) Prior Publication Data

US 2009/0144447 A1 Jun. 4, 2009

(51) Int. Cl.
*G06F 17/30* (2006.01)
(52) U.S. Cl.
CPC ................. *G06F 17/30876* (2013.01)
(58) Field of Classification Search
CPC .......... G06Q 30/0277; G06Q 30/0241; G06Q 30/0251; G06Q 30/0252; G06Q 30/0255; G06Q 30/0264; G06F 17/30887; G06F 17/30876; G06F 17/30867; G06F 17/30882; G06F 17/30; G06F 17/30864; H04L 67/02; H04L 2209/42; H04L 61/301
USPC .......................................... 709/217, 226, 229
See application file for complete search history.

(56) References Cited

U.S. PATENT DOCUMENTS

| | | | | |
|---|---|---|---|---|
| 5,892,900 | A * | 4/1999 | Ginter | G06F 21/10 726/26 |
| 6,189,030 | B1 * | 2/2001 | Kirsch | G06F 17/30876 705/14.55 |
| 6,285,985 | B1 * | 9/2001 | Horstmann | 705/14 |
| 6,772,139 | B1 * | 8/2004 | Smith, III | G06F 17/30855 707/748 |
| 6,973,505 | B1 * | 12/2005 | Schneider | G06F 17/30887 707/E17.115 |
| 7,155,451 | B1 * | 12/2006 | Torres | G06F 17/30867 |
| 8,544,049 | B2 * | 9/2013 | Kamimaki | H04N 7/163 725/105 |
| 8,694,645 | B2 * | 4/2014 | Mason | G06F 17/30887 370/392 |
| 2001/0051978 | A1 * | 12/2001 | Allen | G06F 17/30 709/203 |
| 2002/0010757 | A1 * | 1/2002 | Granik | G06F 17/30876 709/218 |
| 2002/0032600 | A1 * | 3/2002 | Royall, Jr. | G06Q 10/10 705/326 |
| 2002/0052934 | A1 * | 5/2002 | Doherty | G06F 17/30873 709/219 |
| 2002/0055909 | A1 * | 5/2002 | Fung | G06Q 20/10 705/42 |
| 2002/0107718 | A1 * | 8/2002 | Morrill et al. | 705/10 |
| 2003/0188021 | A1 * | 10/2003 | Challenger | G06F 17/30896 709/246 |
| 2003/0229783 | A1 * | 12/2003 | Hardt | G06F 21/33 713/155 |
| 2005/0041858 | A1 * | 2/2005 | Celi | G06F 17/30905 382/173 |
| 2005/0144073 | A1 * | 6/2005 | Morrisroe | G06Q 30/02 705/14.5 |
| 2005/0283621 | A1 * | 12/2005 | Sato | G06F 21/6254 713/189 |
| 2006/0031404 | A1 * | 2/2006 | Kassab | G06F 17/30893 709/218 |
| 2006/0179065 | A1 * | 8/2006 | Xu | 707/100 |
| 2007/0016651 | A1 * | 1/2007 | Blagsvedt | G06F 17/30882 709/217 |
| 2007/0022006 | A1 * | 1/2007 | Lynn | G06Q 30/02 705/14.4 |
| 2007/0067297 | A1 * | 3/2007 | Kublickis | G06Q 30/02 |

(Continued)

*Primary Examiner* — Backhean Tiv
(74) *Attorney, Agent, or Firm* — Brake Hughes Bellermann LLP

(57) ABSTRACT

A uniform resource locator (URL) including an identification of a network resource and one or more tag-variable sets may be determined. One or more variables associated with the URL may be determined based on the tag-variable sets, wherein each tag-variable set may include a variable and a corresponding tag. A target recipient of the URL, associated with one or more values corresponding to the one or more variables, may be determined. Each of the one or more variables may be replaced with the corresponding one or more values in the URL. The URL including the identification of the network resource and one or more tag-value sets may be provided to the target recipient, each tag-value set including the one or more tags and the corresponding one or more values, wherein upon a selection of the URL, the tag-value sets are provided to the network resource via the URL.

12 Claims, 4 Drawing Sheets

(56) References Cited

U.S. PATENT DOCUMENTS

| | | | |
|---|---|---|---|
| 2007/0083640 A1* | 4/2007 | Wagner | H04L 12/2602 709/224 |
| 2007/0168256 A1* | 7/2007 | Horstmann | G06Q 30/02 705/14.67 |
| 2007/0260508 A1* | 11/2007 | Barry | G06Q 30/02 705/14.12 |
| 2007/0260705 A1* | 11/2007 | Armstrong | G06F 17/30899 709/217 |
| 2008/0021781 A1* | 1/2008 | Rosenberg | 705/14 |
| 2008/0133540 A1* | 6/2008 | Hubbard | H04L 63/101 |
| 2008/0195665 A1* | 8/2008 | Mason | H04L 67/22 |
| 2009/0019148 A1* | 1/2009 | Britton | G06Q 30/02 709/224 |
| 2009/0063457 A1* | 3/2009 | Stewart | G06F 17/30887 |
| 2009/0100015 A1* | 4/2009 | Golan | G06F 17/30867 |
| 2009/0132632 A1* | 5/2009 | Jackson | H04L 12/5885 709/201 |
| 2009/0132713 A1* | 5/2009 | Dutta | H04L 67/02 709/227 |
| 2009/0144447 A1* | 6/2009 | Wittig | G06F 17/30876 709/245 |

* cited by examiner

100

200

RESOURCE IDENTIFIER PERSONALIZATION

TECHNICAL FIELD

This description relates to the personalization of resource identifiers, including uniform resource locators (URLs).

BACKGROUND

The growth of electronic communication, including electronic marketing and promotions, has given rise to a corresponding growth in the desire to increase the efficacy of such electronic promotions. Empirical studies have shown that the more personalized an electronic promotion is to a recipient, the greater the likelihood of receiving a response to the electronic promotion from the recipient. For example, an e-mail message about an upcoming sale may be delivered to a potential customer who has expressed prior interest in one or more of the sales items, wherein the e-mail message may include one or more hyperlinks redirecting the potential customer to a website or web server providing more information about one or more of the sale products.

It may be desirable that the websites and/or web servers to which a potential customer is redirected, from responding to and/or clicking on links in such e-mail promotions, has information about the responding customer available such that the website may be personalized for the customer as well and/or information about the responsive customer may be tracked by the web servers. For example, rather than requiring a web server (associated with a URL within an e-mail promotion) to look up an identification number associated with the customer on a separate database or information server to find information about the customer by which to personalize a web page, it may be desirable if the web server had this information immediately available, perhaps through the redirecting URL.

SUMMARY

According to an example embodiment a system is provided. A resource handler may be configured to determine a uniform resource locator (URL) and a target recipient associated with the URL. A parser may be configured to parse the URL for a network address of a network resource and one or more tag-variable sets, each tag-variable set including a variable and a corresponding tag associated with the variable. A value engine may be configured to determine one or more values associated with the target recipient and corresponding to each variable of the one or more tag-variable sets. A URL generator may be configured to replace, in the URL, the one or more tag-variable sets with a corresponding one or more tag-value sets, wherein the variable of each of the one or more tag-variable sets may be replaced with the corresponding one or more values. A delivery engine may be configured to provide the URL, including the network address of the network resource, to the target recipient, wherein upon a selection of the URL, the tag-value sets are provided to the network resource at the network address.

According to another example embodiment, a method is provided. A uniform resource locator (URL) including an identification of a network resource and one or more tag-variable sets may be determined. One or more variables associated with the URL may be determined based on the tag-variable sets, wherein each tag-variable set may include one of the variables and a corresponding tag associated with the one of the variables. A target recipient of the URL may be determined, wherein the target recipient is associated with one or more values corresponding to the one or more variables. Each of the one or more variables may be replaced with the corresponding one or more values in the URL. The URL including the identification of the network resource and one or more tag-value sets may be provided to the target recipient, each tag-value set including the one or more tags and the corresponding one or more values, wherein upon a selection of the URL, the tag-value sets are provided to the network resource via the URL.

According to another example embodiment, a method is provided. During a design time, one or more variables may be determined from a plurality of variables, the one or more variables corresponding to one or more values associated with each of one or more target recipients, including a first target recipient. One or more tags corresponding to each of the one or more variables may be determined during the design time. During the design time, a network address of a network resource configured to receive the one or more values may be identified. During an execution time, the one or more values, corresponding to each of the one or more variables, associated with the first target recipient may be determined. During the execution time, the one or more tags, corresponding to each of the one or more values may be identified. A uniform resource locator (URL) may be generated during the execution time, the URL including the network address of the network resource, the one or more tags and one or more corresponding values for the first target recipient. The one or more tags and one or more corresponding values may be delivered to the network resource at the network address, responsive to a selection of the URL by the first target recipient.

The details of one or more implementations are set forth in the accompanying drawings and the description below. Other features will be apparent from the description and drawings, and from the claims.

DETAILED DESCRIPTION

Figure 1:
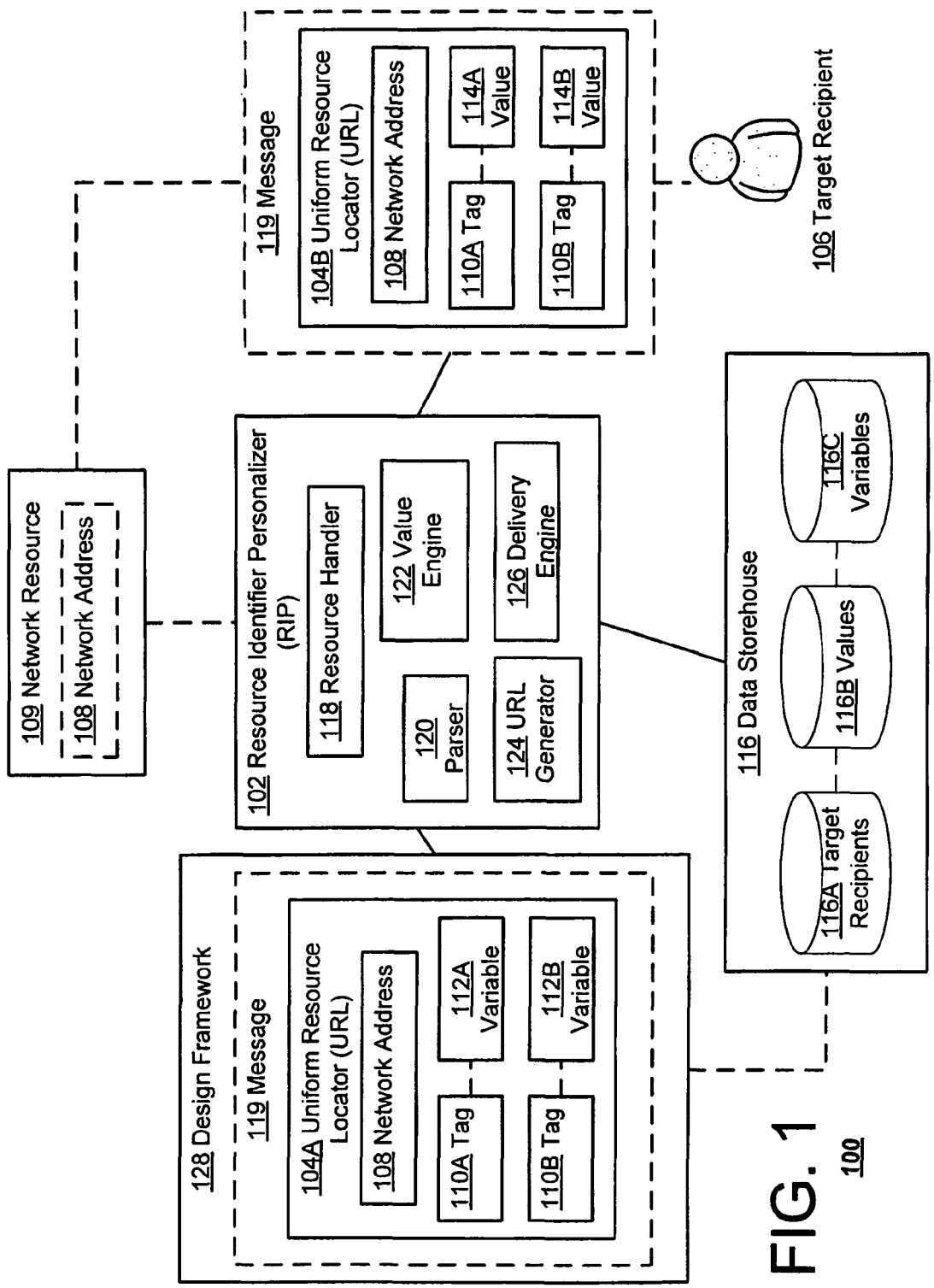
FIG. 1 is a block diagram of an example implementation of a resource identifier personalization system, according to an example embodiment.

FIG. 1 is a block diagram of an example implementation of a resource identifier personalization system, according to an example embodiment. In the example of FIG. 1, a system 100 may include a resource identifier personalizer (RIP) 102 for personalizing one or more resource locators or resource identifiers, including the uniform resource locator (URL) 104A. The RIP 102 may be used, for example, to modify, update or otherwise personalize one or more URLs 104A which may be sent, as hyperlinks, to an intended or target recipient 106.

Such URL personalization may involve, for example, including information pertaining to or associated with the target recipient 106 intended to receive the URL 104A, directly in the URL 104B. For example, the personalized URL 104B may include information about the identity, location and/or preferences of the target recipient 106. Then for example, when the target recipient 106 selects or clicks a link associated with the personalized URL 104B, the customer information from the URL 104B may be made available to a server or other network device to which the URL 104B is directed. This may allow the server or other network system not only to track information about which target recipients 106 responded to the hyperlinks, as included in the personalized URLs 104B, but also personalize the web or other server page(s) provided to the target recipient 106 responsive to the selection of the personalized URLs 104B or hyperlinks associated therewith.

The URLs 104A and 104B may include a string, or strings, of characters used to identify, name or otherwise locate a resource. The URL 104 may include a uniform resource locator (URL), uniform resource identifier (URI), or other resource identifier that may be consistent with one or more network protocols. For example, the URL 104A may include, at least in part, a website name, such as "http://www.websitename.com/ . . . " or an internet protocol (IP) address such as "111.22.333.4 . . . ".

The target recipient 106 may include a potential, intended, target or actual recipient of the URLs 104A and 104B. For example, the target recipient 106 may include a potential, past, or current customer or client of a vendor, wherein the vendor may solicit the target recipient 106 for a sales promotion or other marketing campaign. Then for example, the target recipient 106 may be identified by an e-mail, IP or other address associated with the target recipient 106.

The URLs 104 may include a first URL 104A and a second URL 104B. The first URL 104A may identify which information about the target recipient 106 is to be included in the URL 104B, e.g., as determined by one or more variables 112A and 112B. Then for example, the first URL 104A may include a network address 108, one or more tags 110A and 110B and one or more corresponding variables 112A and 112B, e.g., tag-variable sets. The URL 104B may include a personalized version of the URL 104A, wherein for example, the variables 112A and 112B may be replaced with one or more corresponding values 114A and 114B. Then for example, the second URL 104B may include the network address 108, the one or more tags 110 and one or more values 114, e.g., tag-value sets, corresponding to each of the one or more variables 112. In the example of FIG. 1, the URL 104A may be determined during a design-time associated with the system 100, wherein the URL 104B may be the result of processing of the URL 104A by the system 100 during an execution time.

As referenced above, the URLs 104 may include a network address 108. The network address 108 may include an identification and/or location of a network resource 109. The network address 108 may include an identification of a location of the network resource 109 on a network. For example, the network address 108 may include a website name, such as "http://www.websitename.com" or may include an internet protocol (IP) address such as "111.22.333.4". Thus the network address 108 may be a component of the URL 104, identifying the network resource 109 associated with the URL 104.

Then network resource 109 may include a device, system or other resource configured to receive the URL 104B and identify and process the values 114 (e.g., value 114A and value 114B). For example, the network resource 109 may include a server, such as a web server, connected to a network, configured to parse the URL 104B for the values 114A and 114B (as identified by the tags 110A and 110B) and provide a web page, personalized for the target recipient 106 using one or more of the values 114A and 114B, responsive to the target recipient 106 selecting the URL 104B.

The tags 110A and 110B may include a tag, identifier or other label that may be used to identify the variables 112A and 112B and/or the values 114A and 114B. The tag 110A may include, for example, a string of characters as determined by a vendor to describe or otherwise identify the variable 112A to the network resource 109. In an example embodiment, the system 100 may include a set of one or more predetermined tags 110A, 110B that may be selected or chosen for inclusion in the URLs 104A, 104B. Each tag 110A and 110B may be used to describe and correspond to a different variable 112A, 112B. The tags 110A and 110B may be determined, or otherwise received during a design-time of the system 100. For example, the tag 110A may include "Customer_F_Name" to indicate that the corresponding variable 112A and value 114A may identify the first name of the target recipient 106, wherein the tag 10B may include "State" to indicate that the corresponding variable 112B and value 114B may identify the state in which the target recipient 106 is located.

The variables 112A and 112B may include a system identifier or locator used to describe, identify, or locate which information about the target recipients 106A may be included in the URL 104. According to an example embodiment, the variables 112A and 112B may or may not be the same or similar to the tags 110A and 110B. For example, the tag 110A may include "Cust_Identifier" and the corresponding variable 112A may include "c:/customer_information/clientX/C_ID". In another example, the tag 110B and the variable 112B for the target recipient's 106 phone number may both include a value "Phone_Num".

Then for example, as discussed above, the variables 112A and 112B in the URL 104A may be replaced with the values 114A and 114B, respectively. The values 114A and 114B may include actual or recorded information about the target recipient 106 that corresponds to the variables 112A and 112B in a data storehouse 116. For example the tags 110A and 10B may include "F_Name" and "L_Name", respectively, and be associated with corresponding variables 112A and 112B "C_first" and "C_last", wherein the first name and last name of the target recipient 106 may include "John" and "Smith". Then for example, the values 114A and 114B may include "John" and "Smith", respectively.

According to an example embodiment, the data storehouse 116 may include a server, database, spreadsheet, memory (including content-addressable memory), or other storage unit(s). The data storehouse 116 may store, for example, target recipient information 116A which may include a list of potential target recipients 106 that may be selected to receive the personalized URLs 104B. The data storehouse 116 may also store, for example, a list of a plurality of variables 116C that may be selected as variables 112A and 112B to be included in the URL 104A, and a plurality of values 116B corresponding to each of the variables 116C for each of the target recipients 116A. The values 114A and 114B, as included in the URL 104B, may be determined from the values 116B.

The RIP 102 may include a resource handler 118. The resource handler 118 may receive the URL 104A and determine which target recipient(s) 106 are associated with the URL 104A. For example, the URL 104A may be part of a marketing e-mail, promotion or other message (e.g., message 119) to be sent to a thousand customers (e.g., target recipients 106). Then for example, the resource handler 118 may determine which thousand customers are to receive the message 119.

The message 119 may include a message to be sent to the target recipient 106, wherein the message includes one or more URLs 104A. For example, the message 119 may include an e-mail message, HTML (hyper-text markup language) page, word processing document, short message (SMS) and/or any other message or document that may include one or more URLs 104A. According to an example embodiment, the message 119 may include an HTML based e-mail with a plurality of URLs 104B, each URL 104B being associated with one or more text and/or images of the message 119. Then for example, the text and/or images of the message 119 may include hyperlinks, which when selected by the target recipient 106, redirects the target recipient 106 to the URL 104B.

According to an example embodiment, the RIP 102 may include a parser 120 configured to parse the URL 104A into various elements or components. For example, the parser 120 may parse the URL 104A into the network address 108, the tags 110A and 110B and corresponding variables 112A and 112B. As will be discussed below, the parser 120 may parse the URL 104A into the components or elements by identifying one or more prefixes or other identifying characters associated with each URL 104A element or component. As referenced above, the system 100 may be associated with a design time and execution time, wherein the parser 120 may be configured to parse the URL 104A during either the design time or execution time.

According to an example embodiment, the RIP 102 may further include a value engine 122 configured to determine the values 114A and 114B, corresponding to the variables 112A and 112B, respectively. The value engine 122 may for example, access the data storehouse 116 to determine which of the values 116B correspond to the variables 112A and 112B (of the variables 116C) included in the URL 104A, for each target recipient 106 (from the target recipients 116A) for which the message 119 is intended. According to an example embodiment, the value engine 122 may, during an execution time, determine all of the corresponding values 114A and 114B (from the values 116B) for each target recipient 106 at once for each URL 104A included in the message 119, and store the values in a buffer (not shown). This may allow, for example, more rapid processing of the URL 104A by minimizing the number of accesses to the data storehouse 116 by the value engine 122.

According to an example embodiment, the RIP 102 may include a URL generator 124 configured to generate the URL 104B. The URL generator 124 may, for example, replace the variables 112A and 112B (including any prefix and/or suffix associated therewith) with the corresponding values 114A and 114B, respectively. In an example embodiment, the URL generator 124 may assemble the URL 104B from the URL 104A elements determined by parser 120 (as discussed above), wherein the variables 112A and 112B are replaced with the values 114A and 114B.

According to an example embodiment, the RIP 102 may include a delivery engine 126 configured to provide the message 119, including the personalized URL 104B, to the target recipient 106. For example, the delivery engine 126 may be associated with or otherwise connected to a network, such as the Internet or an intranet, by which the message 119 will be delivered to the e-mail account of the target recipient 106. Then for example, upon a selection of the URL 104B (or hyperlink associated therewith), the tags 110A and 110B and corresponding values 114A and 114B may be provided to the network resource 109 at the network address 108. Then, the network resource 109 may use the values 114A and 114B to respond to the target recipient's 106 selection of the URL 104B. For example, the network resource 109 may provide a personalized web page to the target recipient 106, using the values 114A and 114B from the personalized URL 104B.

According to an example embodiment, the message 119 and/or the URL 104A may be determined or designed using a design framework 128. The design framework 128 may include any program, interface (including user interface) or device configured to construct or provide the message 119, including the URL 104A, to the RIP 102. For example, the design framework 128 may include a generic HTML editor. In an example embodiment, the design framework 128 may include a specialized program wherein all of the possible variables 112 that may be included in the message 119 are already stored. Then for example, the design framework 128 may be used to construct a template or mailform associated with the message 119, including one or more URLs 104A. Then for example, a vendor or marketer may provide the network address 108, tags 110A and 110B, and selection of the variables 116C for the URLs 104A in the message 119, as well as provide other content or text of the message 119, as may be needed for a marketing campaign.

The system 100 may allow a foreign or outside network device (e.g., network resource 109) access to information about a visitor (e.g., target recipient 106) directly in the URL 104B, e.g., without accessing a separate and potentially proprietary or private information base (e.g., data storehouse 116). This may allow the network device to personalize responses to the visitor and/or track information about the visitors.

Figure 2:
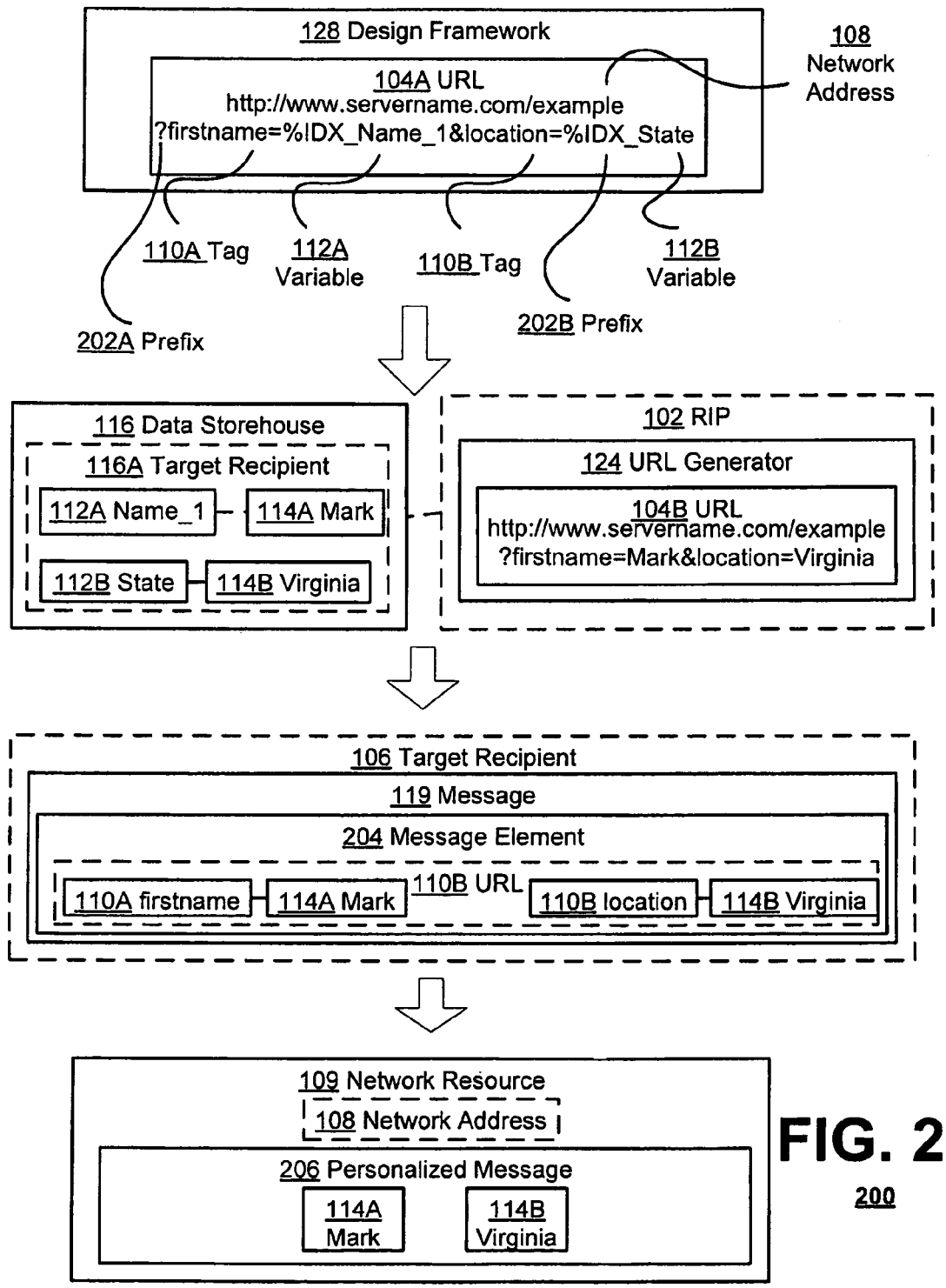
FIG. 2 is a block diagram of an example flow diagram of a resource identifier personalization (RIP) system, according to an example embodiment.

FIG. 2 is a block diagram of an example flow diagram 200 of a resource identifier personalization (RIP) system, according to an example embodiment. In the example of FIG. 2, the design framework 128 may include the URL 104A, including one or more tag-variable (e.g., tag 110A-variable 112A) sets and one or more prefixes 202A and 202B.

The prefixes 202A and 202B may include one or more characters or symbols used to identify one or more elements of the URL 104A. For example, the prefixes 202A and 202B may be used by a parser (e.g., parser 120) to parse the URL 104A into the network address 108, and tag-variable sets (e.g., tag 110A-variable 112A and tag 110A-variable 112B). In the example of FIG. 2, the prefix 202A may include "?" which may indicate the end of the network address 108, which may be the first element of the URL 104A. In an example embodiment, the prefix 202A may be part of a URL protocol or specification. For example, the "?" may indicate that one or more URL parameters are to follow. Then for example, the prefix 202B may include "% IDX_" which may indicate the beginning of a variable 112A or 112B. The URL 104A, may also include a "&" that indicates the end of a first tag-variable set and the beginning of a second. In other example embodiments additional and/or different prefixes 202 to indicate different URL elements. One skilled in the art of data processing will appreciate that many additional and/or different prefixes, suffixes, or other separator indicators may be used to separate or delineate various elements or components of strings such as URLs, without departing from the spirit or scope of the discussion herein.

The RIP 102 may then parse the URL 104A and determine the values 114A and 114B that correspond to the variables 112A and 112B for the target recipient 106. For example, the value 114A of the variable 112A "Name_1" may include "Mark" and the value 114B of the variable 112B "State" may include "Virginia" for the target recipient 106. Then for example, the URL generator 124 may replace the variables 112A and 112B with the values 114A and 114B in the URL 104B. Then the RIP 102 may provide the personalized URL 104B in the message 119 to the target recipient 106.

According to an example embodiment, the URLs 104A and 104B may be associated with text or an image(s) (e.g., message element 204) that may be displayed instead of the URL 104B in the message 119 as a hyperlink. In an example embodiment, the URL 104B may be associated with a response tracking functionality that tracks and/or records information associated with which target recipients 106 responded to which portions of the message 119, including the URLs 104B. The response tracking may be on a recipient-by-recipient basis, or may group several recipients together. The response tracking may include for example, information regarding who clicked on a link, when it was clicked, how often, which link, and the total number of clicks for the message 119.

The personalized URL 104B is associated with a message element 204. The message element 204 may include any element or component of the message 119. For example, the message element may include an image, that if clicked by the target recipient 106, directs the target recipient's browser to the URL 104B. Or for example, the message element may include text or another element included in the message 119. For example, if the message 119 included a sales promotion for a product, then the message element 204 may include an image of the product or text about the product and/or promotion.

Upon a selection of the URL 104B and/or the message element 204, from the message 119, the URL 104B may be provided to the network resource 109 at the network address 108. Then for example, the network resource 109 may determine the values 114A and 114B from the URL 104B, as identified by the tags 110A and 110B, respectively. For example, the tag 110A "firstname" may identify the value 114A "Mark" and the tag 110B "location" may identify the value "Virginia." The network resource 109 may then either track or monitor the values 114A and 114B for the target recipient 106 and/or use them to respond to the selection of the URL 104A, e.g., by providing a personalized message 206.

The personalized message 206 may include a page, message or other document associated with the URL 104B. For example, the personalized message 206 may include a web page personalized based on the values 114A and 114B, wherein the tags 110 may correspond to variables used in the code of the personalized message 206. Thus, the personalized message 206 may include, for example, "Hello [firstname]" wherein the tag 110A firstname may be replaced by "Mark". Thus the personalized message 206 may read "Hello Mark".

Figure 3:
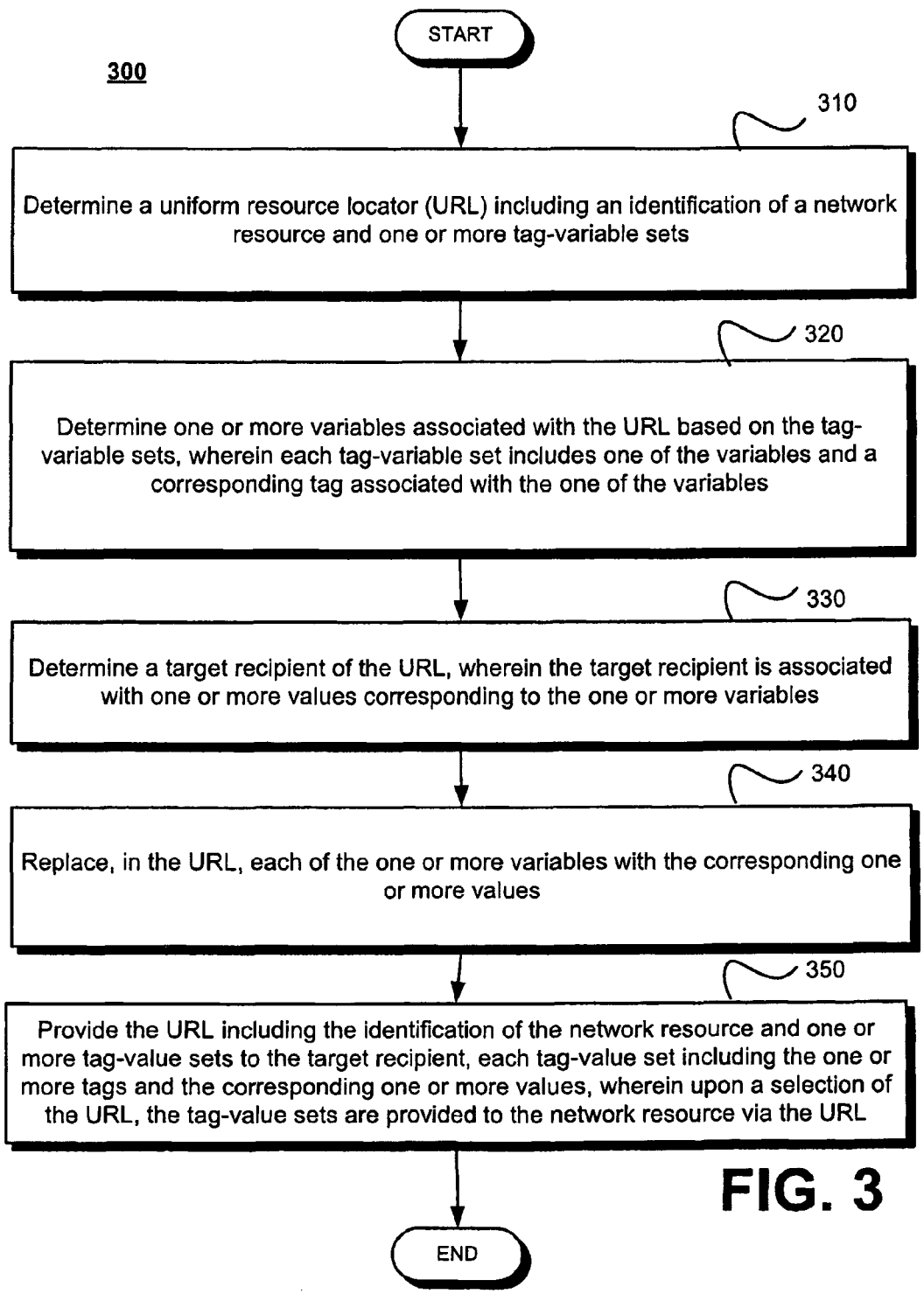
FIG. 3 is a flowchart illustrating example operations of the system of FIG. 1, according to an example embodiment.

FIG. 3 is a flowchart 300 illustrating example operations of the system of FIG. 1, according to an example embodiment. More specifically, FIG. 3 illustrates an operational flow 300 representing example operations related to a resource identifier personalization system 100.

After a start operation, a uniform resource locator (URL), including an identification of a network resource and one or more tag-variable sets, may be determined (310). For example, as shown in FIG. 1, the resource handler 118 may determine the URL 104A from the message 119. The URL 104A may include, for example, the network address 108 of the network resource 109, a first tag-variable set 110A-112A and a second tag-variable set 110B-112B.

One or more variables associated with the URL may be determined based on the tag-variable sets, wherein each tag-variable set includes one of the variables and a corresponding tag associated with the one of the variables (320). For example, the parser 120 may determine the tags 110A and 110B and the corresponding variables 112A and 112B from the URL 104A. According to an example embodiment, the parser 120 may parse the URL 104A for one or more prefixes (e.g., 202) identifying the various elements or components of the URL 104A.

A target recipient of the URL may be determined, wherein the target recipient is associated with one or more values corresponding to the one or more variables (330). For example, the target recipient 106 may be identified from the target recipients 106A, wherein each of the target recipients 106A may include values 114 corresponding to the variables 112, as stored in the data storehouse 116.

Each of the one or more variables may be replaced in the URL with the corresponding one or more values (340). For example, the value engine 122 may determine the values 114A and 114B that correspond to the variables 112A and 112B, respectively, from the data storehouse 116. Then for example, the URL generator 124 may replace the variables 112A and 112B with the values 114A and 114B, in the URL 104B. Then for example, the URL 104B may include one or more tag-value sets that correspond to each of the tag-variable sets.

The URL, including the identification of the network resource and one or more tag-value sets, may be provided to the target recipient, each tag-value set including the one or more tags and the corresponding one or more values, wherein upon a selection of the URL, the tag-value sets are provided to the network resource via the URL (350). For example, the URL 104B may be provided to the target recipient 106 by the delivery engine 126. Then for example, if the target recipient 106 selects the URL 104B from the message 119, the network resource 109 may receive the tag-value sets 110A-114A and 110B-114B from the URL 104B.

Figure 4:
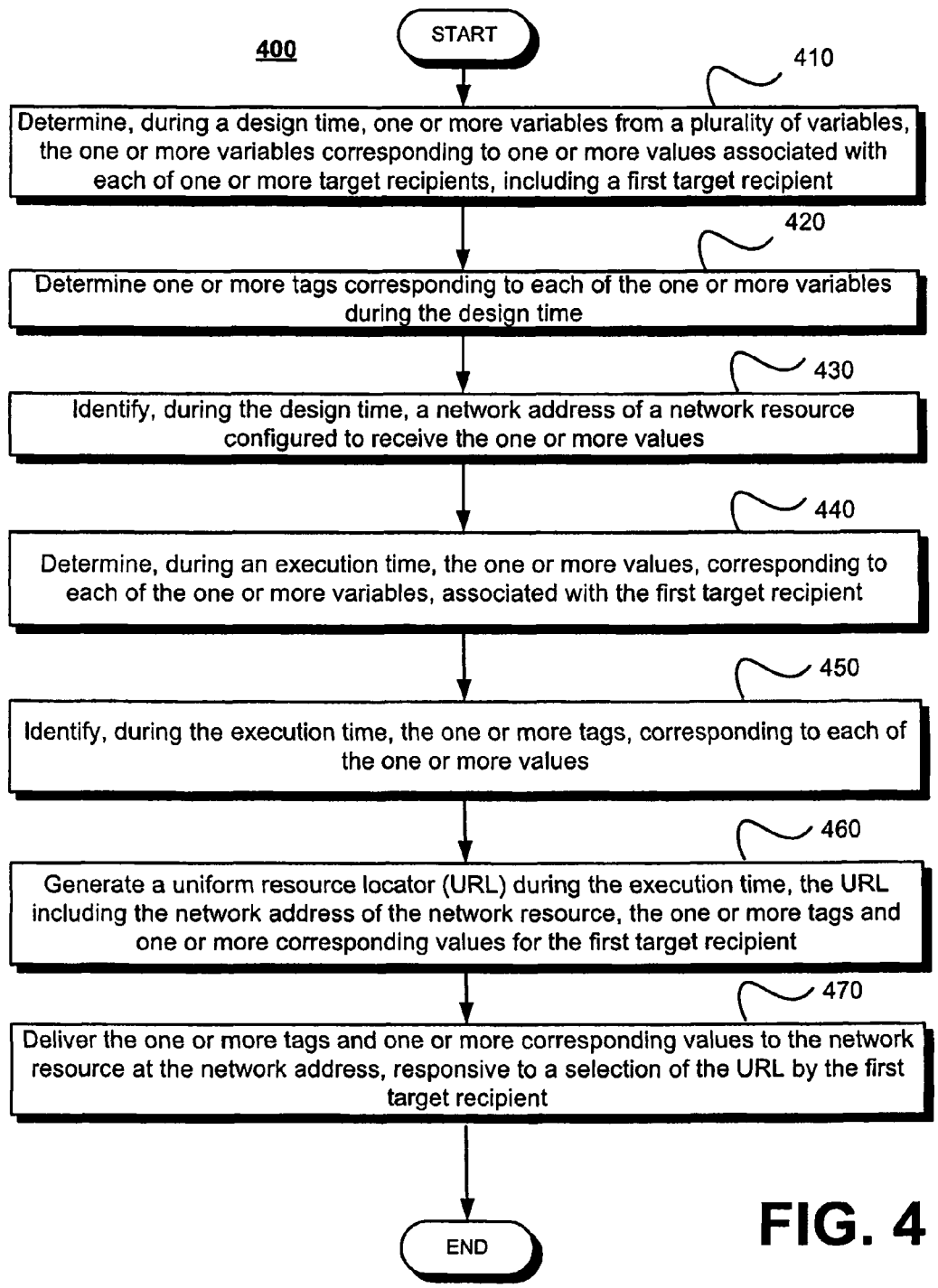
FIG. 4 is a flowchart illustrating example operations of the system of FIG. 1, according to an example embodiment.

FIG. 4 is a flowchart 400 illustrating example operations of the system of FIG. 1, according to an example embodiment. More specifically, FIG. 4 illustrates an operational flow 400 representing example operations related to a resource identifier personalization system 100.

After a start operation, during a design time, one or more variables may be determined from a plurality of variables, the one or more variables corresponding to one or more values associated with each of one or more target recipients, including a first target recipient (410). For example, as shown in FIG. 1, the variables 112A and 112B may be determined from the variables 112 by the design framework 128, the variables 112A and 112B corresponding to one or more of the values 114 for each of the target recipients 106A.

One or more tags corresponding to each of the one or more variables may be determined during the design time (420). For example, the design framework 128 may receive the tags 110A and 110B, corresponding to the variables 112A and 112B, respectively, during a design time of the system 100.

During the design time, a network address of a network resource configured to receive the one or more values may be identified (430). For example, the parser 120 may determine the network address 108 of the network resource 109, wherein the network resource 109 is configured to receive one or more of the values 114.

During an execution time, the one or more values, corresponding to each of the one or more variables, associated with the first target recipient may be determined (440). For example, during an execution time of the system 100, the value engine 122 may determine the values 114A and 114B corresponding to the variables 112A and 112B, as associated with the target recipient 106.

During the execution time, the one or more tags, corresponding to each of the one or more values may be identified (450). For example, the parser 120 may identify the tags 110A and 110B corresponding to the values 114A and 114B, respectively.

A uniform resource locator (URL) may be generated during the execution time, the URL including the network address of the network resource, the one or more tags and one or more corresponding values for the first target recipient (460). For example, the URL generator 124 may generate the URL 104B, the URL 104B including the network address 108, the tags 10A and 10B, and the corresponding values 114A and 114B.

The one or more tags and one or more corresponding values may be delivered to the network resource at the network address, responsive to a selection of the URL by the first target recipient (470). For example, the delivery engine 126 or other network device may deliver the tags 110A and 110B and corresponding values 114A and 114B to the network resource 109 at the network address 108, responsive to a selection of the URL 104B by the target recipient 106.

According to an example embodiment, a design time and an execution time may be provided. During the design time, for example, a mailform associated with the message 119 may be generated via the design framework 128. The mailform may include, for example, a template for generating the message 119, the template including static as well as variable elements. A static element may include text to be sent to each target recipient 106, whereby a variable element may include the URL 104A that may change based on some information associated with a particular target recipient 106. According to an example embodiment, the design framework 128 may provide, during the design time, a selection of one or more of the variables 112 that may be used in the URL 104A. Then for example, one or more of the variables 112 may be selected for use in the URL 104A. Thus, during the design time, the mailform or template for the message 119, including the URL 104A, may be generated.

Then for example the RIP 102 may call one or more methods, e.g., via the parser 120, to determine the variables 112A and 112B and tags 110A and 110B included in the URL 104A. Then, during an execution time, the RIP 102 may lookup, store and/or replace all the variables 112 in the URL 104A with their corresponding values 114, for each target recipient 106. Grouping the number of times the RIP 102 accesses the data storehouse 116, e.g., to look-up the values 114 corresponding to the variables 112, may allow for greater processing speed than if each variable 112 is looked up separately for each target recipient 106. Then the message 119, including the personalized URL 104B, may be provided to the target recipients 106 via internet mail, plain text or HTML, fax or short message service (SMS). In an example embodiment, one or more elements of the RIP 102 may be part of an execution service used to personalize the message 119, including the URL 104A. For example, an execution service may include value engine 122, URL generator 124 and/or deliver engine 126.

According to an example embodiment, during the execution time, the URL generator 124 may replace the variables 112A and 112B of the URL 104B with the values 114A and 114B to generate the URL 104B. In other example embodiments, that may result in a greater processing time, the URL generator 124 may remove or extract the tag-variable sets from the URL 104A and create new tag-value sets in the URL 104B, rather than replacing the variables 112A and 112B with the values 114A and 114B.

Although the above description is provided in terms of specific examples, it will be appreciated that many other examples and settings are contemplated. For example, the term business document should be interpreted broadly as including any document that is used in profit generation of some sort, although the business document 104 also may refer to documents for non-profit endeavors as well, including, for example, schools, churches, charities, hospitals, or virtually any other organization. Further, the business document 104 is merely an example, and other applications, such as applications for personal use, also may be used.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the embodiments.

What is claimed is:

1. A system comprising one or more processors loaded with computer instructions causing the one or more processors to function as:
   a resource handler configured to determine a uniform resource locator (URL) and an individual recipient from a proprietary database of individual recipients;
   a parser configured to parse the URL to determine a network address of a network resource and one or more tag-variable sets, each tag-variable set including a variable and a corresponding tag associated with the variable;
   a value engine configured to determine for each variable included in the one or more tag-variable sets of the URL, one or more values that is associated with the individual recipient in the proprietary database of individual recipients;
   a URL generator configured to replace, in the URL, the one or more tag-variable sets with a corresponding one or more tag-value sets, wherein the variable of each of the one or more tag-variable sets is replaced with the corresponding one or more values that are associated with the individual recipient in the proprietary database of individual recipients, to thereby form a personalized URL with the network address of the network resource and the one or more values embedded therein; and
   a delivery engine configured to send the personalized URL to the individual recipient,
   wherein, upon selection of the personalized URL by the individual recipient, the one or more tag-value sets are provided to the network resource via the personalized URL for extraction therefrom and subsequent inclusion thereof within a personalized website provided to the individual recipient.

2. The system of claim 1 wherein the resource handler is configured to locate the personalized URL in a message sent to the individual recipient.

3. The system of claim 1 wherein the parser is configured to identify a prefix associated with each tag-variable set of the personalized URL.

4. The system of claim 3 wherein the URL generator is configured to replace, in the personalized URL, the tag-variable sets, including the prefix, with the one or more tags and the one or more corresponding values.

5. The system of claim 1 wherein the URL generator is configured to replace, for each of a plurality of individual recipients, each variable with a corresponding value of the variable that is associated with the individual recipient in the proprietary database of individual recipients.

6. A computer-implemented method, comprising:
   generating a uniform resource locator (URL), the URL including a character string that identifies a network resource and one or more tag-variable sets;
   determining an individual recipient who is to receive the generated URL from a proprietary database of individual recipients;
   replacing, in the URL, each of the one or more tag-variable sets with a corresponding tag-value set, wherein the value in each of the tag-value sets is a value for the variable that is being replaced and is associated with the individual recipient in the proprietary database of individual recipients, to thereby form a personalized URL with the network address of the network resource and the one or more values embedded therein; and
   sending the personalized URL including the identification of the network resource and one or more tag-value sets to the individual recipient,
   wherein, upon selection of the personalized URL by the individual recipient, the one or more tag-value sets are provided to the network resource via the personalized URL for extraction therefrom and subsequent inclusion thereof within a personalized website provided to the individual recipient;
   wherein each of the foregoing actions are performed by at least one computer.

7. The method of claim 6 wherein determining an individual recipient comprises receiving an identification of one or more target recipients, including the individual recipient.

8. The method of claim 6 wherein sending the personalized URL comprises transmitting a message that includes the personalized URL to the individual recipient.

9. A computer implemented method comprising:
   determining, during a design time, one or more variables from a plurality of variables, the one or more variables corresponding to information that is associated with one or more individual recipients in a proprietary database of individual recipients;
   determining, during an execution time, an individual recipient, and one or more values for each of the one or more variables, the one or more values providing information that is associated with the individual recipient in the proprietary database of individual recipients;
   generating a personalized uniform resource locator (URL) during the execution time, the personalized URL including the network address of a network resource, and one or more values for each of the one or more variables corresponding to information that is associated with the individual recipient in the proprietary database of individual recipients, to thereby obtain a personalized URL with the network address of the network resource and the one or more values embedded therein; and
   sending the personalized URL to the individual recipient in a message,
   wherein, upon selection of the personalized URL by the individual recipient, the one or more tag-value sets are provided to the network resource via the personalized URL for extraction therefrom and subsequent inclusion thereof within a personalized website provided to the individual recipient.

10. The method of claim 9 wherein determining during a design time, one or more variables from a plurality of variables comprises determining, during the design time, the one or more variables from a template associated with a message.

11. The method of claim 10 wherein generating a personalized URL during the execution time comprises generating the personalized URL by an execution service during the execution time, the execution service configured to personalize the message that includes the personalized URL for the individual recipient.

12. The method of claim 9 wherein generating a URL during the execution time comprises replacing each of the one or more variables with the one or more corresponding values.

* * * * *